United States Patent
Benning et al.

(10) Patent No.: US 6,920,314 B2
(45) Date of Patent: Jul. 19, 2005

(54) SYMMETRIC SWEEP PHASE SWEEP TRANSMIT DIVERSITY

(75) Inventors: Roger David Benning, Long Valley, NJ (US); R. Michael Buehrer, Morristown, NJ (US); Paul Anthony Polakos, Marlboro, NJ (US); Robert Atmaram Soni, Morris Plains, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 862 days.

(21) Appl. No.: 09/918,392

(22) Filed: Jul. 30, 2001

(65) Prior Publication Data

US 2003/0022635 A1 Jan. 30, 2003

(51) Int. Cl.$^7$ .................................................. A04B 1/02
(52) U.S. Cl. .................. 455/101; 455/103; 455/118; 455/295; 455/296; 455/301; 455/302; 455/303
(58) Field of Search .................. 455/101, 103, 455/118; 375/267

(56) References Cited

U.S. PATENT DOCUMENTS 6,424,679 B1 * 7/2002 Dabak et al. ................ 375/267

FOREIGN PATENT DOCUMENTS

| EP | 1 087 562 | 3/2001 | ............ H04L/1/00 |
| WO | WO 00 51265 | 8/2000 | ............ H04B/7/00 |

OTHER PUBLICATIONS

Alberto Gutierrez, et al "An Introduction to PSTD for IS-95 and cema2000", *IEEE Wireless Communications and Networking Conference* (Sep. 21, 1999), pp. 1358–1362.

Robert A. Soni, et al, "Open–Loop Transmit Diversity in IS–2000 Systems", *Signals, Systems, and Computers, Conference Record of the 33$^{rd}$ Asilomar Conference*, (Oct. 24, 1999), pp. 654–658.

European Search Report.

* cited by examiner

*Primary Examiner*—William J. Deane, Jr.
*Assistant Examiner*—M. C. Ubiles
(74) *Attorney, Agent, or Firm*—Jimmy Goo

(57) ABSTRACT

Described herein is a method and apparatus for transmission that provides the performance of space time spreading (STS) or orthogonal transmit diversity (OTD) and the backwards compatibility of phase sweep transmit diversity (PSTD) without degrading performance of either STS or PSTD using a symmetric sweep PSTD transmission architecture. In one embodiment, a pair of signals $s_1$ and $s_2$ are split into signals $s_1(a)$ and $s_1(b)$ and signals $s_2(a)$ and $s_2(b)$, respectively. Signal $s_1$ comprises a first STS/OTD signal belonging to an STS/OTD pair, and signal $s_2$ comprises a second STS/OTD signal belonging to the STS/OTD pair. Signals $s_1(b)$ and $s_2(b)$ are phase swept using a pair of phase sweep frequency signals that would cancel out any self induced interference. For example, the pair of phase sweep frequency signals utilize a same phase sweep frequency with one of the phase sweep frequency signals rotating in the opposite direction plus an offset of $\pi$ relative to the other phase sweep frequency signal. The resultant phase swept signals $s_1(b)$ and $s_2(b)$ are added to signals $s_2(a)$ and $s_1(a)$ before being amplified and transmitted.

24 Claims, 4 Drawing Sheets

SYMMETRIC SWEEP PHASE SWEEP TRANSMIT DIVERSITY

RELATED APPLICATION

Related subject matter is disclosed in the following applications filed concurrently and assigned to the same assignee hereof: U.S. patent application Ser. No. 09/918,391 entitled, "Space Time Spreading and Phase Sweep Transmit Diversity", inventors Roger Benning, R. Michael Buehrer, Paul A Polakos and Rober Atmaram Soni; U.S. application Ser. No. 09/918,393 entitled, "Biased Phase Sweep Transmit Diversity", inventors Roger Benning, R. Michael Buehrer and Robert Atmaram Soni; and U.S. patent application Ser. No. 09/918,086 entitled, "Split Shift Phase Sweep Transmit Diversity", inventors Roger Benning, R. Michael Buehrer, Robert Atmaram Soni and Paul A. Polakos.

BACKGROUND OF THE RELATED ART

Performance of wireless communication systems is directly related to signal strength statistics of received signals. Third generation wireless communication systems utilize transmit diversity techniques for downlink transmissions (i.e., communication link from a base station to a mobile-station) in order to improve received signal strength statistics and, thus, performance. Two such transmit diversity techniques are space time spreading (STS) and phase sweep transmit diversity (PSTD).

FIG. 1 depicts a wireless communication system 10 employing STS. Wireless communication system 10 comprises at least one base station 12 having two antenna elements 14-1 and 14-2, wherein antenna elements 14-1 and 14-2 are spaced far apart for achieving transmit diversity. Base station 12 receives a signal S for transmitting to mobile-station 16. Signal S is alternately divided into signals $S_e$ and $s_o$ wherein signal $s_e$ comprises even data bits and signal $s_o$ comprises odd data bits. Signals $s_e$ and $s_o$ are processed to produce signals $S^{14-1}$ and $S^{14-2}$. Specifically, $s_e$ is multiplied with Walsh code $w_1$ to produce signal $s_e w_1$; a conjugate of signal $s_o$ is multiplied with Walsh code $w_2$ to produce signal $s_o^* w_2$; signal $s_o$ is multiplied with Walsh code $w_1$ to produce $s_o w_1$; and a conjugate of signal $s_e$ is multiplied with Walsh code $w_2$ to produce $s_e^* w_2$. Signal $s_e w_1$ is added to signal $s_o^* w_2$ to produce signal $S^{14-1}$ (i.e., $S^{14-1} = s_e w_1 + s_o^* w_2$) and signal $s_e^* w_2$ is subtracted from signal $s_o w_1$ to produce signal $S^{14-2}$ (i.e., $S^{14-2} = s_o w_1 - s_e^* w_2$). Signals $S^{14-1}$ and $S^{14-2}$ are transmitted at substantially equal or identical power levels over antenna elements 14-1 and 14-2, respectively. For purposes of this application, power levels are "substantially equal" or "identical" when the power levels are within 1% of each other.

Mobile-station 16 receives signal R comprising $\gamma_1(S^{14-2}) + \gamma_2(S^{14-2})$, wherein $\gamma_1$ and $\gamma_2$ are distortion factor coefficients associated with the transmission of signals $S^{14-1}$ and $S^{14-2}$ from antenna elements 14-1 and 14-2 to mobile-station 16, respectively. Distortion factor coefficients $\gamma_1$ and $\gamma_2$ can be estimated using pilot signals, as is well-known in the art. Mobile-station 16 decodes signal R with Walsh codes $w_1$ and $w_2$ to respectively produce outputs:

$$W_1 = \gamma_1 s_e + \gamma_2 s_o \text{tm equation 1}$$

$$W_2 = \gamma_1 s_o^* - \gamma_2 s_e^* \quad \text{equation 1a}$$

Using the following equations, estimates of signals $s_e$ and $s_o$, i.e., $\hat{s}_e$ and $\hat{s}_o$, may be obtained:

$$\hat{s}_e = \gamma_1^* W_1 - \gamma_2 W_2^* = s_e(|\gamma_1|^2 + |\gamma_2|^2) + \text{noise} \quad \text{equation 2}$$

$$\hat{s}_o = \gamma_2^* W_1 + \gamma_1 W_2^* = s_o(|\gamma_1|^2 + |\gamma_2|^2) + \text{noise}' \quad \text{equation 2a}$$

However, STS is a transmit diversity technique that is not backward compatible from the perspective of the mobile-station. That is, mobile-station 16 is required to have the necessary hardware and/or software to decode signal R. Mobile-stations without such hardware and/or software, such as pre-third generation mobile-stations, would be incapable of decoding signal R.

By contrast, phase sweep transmit diversity (PSTD) is backward compatible from the perspective of the mobile-station. FIG. 2 depicts a wireless communication system 20 employing PSTD. Wireless communication system 20 comprises at least one base station 22 having two antenna elements 24-1 and 24-2, wherein antenna elements 24-1 and 24-2 are spaced far apart for achieving transmit diversity. Base station 22 receives a signal S for transmitting to mobile-station 26. Signal S is evenly power split into signals $s_1$ and $s_2$ and processed to produce signals $S^{24-1}$ and $S^{24-2}$, where $s_1 = s_2$. Specifically, signal $s_1$ is multiplied by Walsh code $w_k$ to produce $S^{24-1} = s_1 w_k$, where k represents a particular user or mobile-station. Signal $s_2$ is multiplied by Walsh code $w_k$ and a phase sweep frequency signal $e^{j2\pi f_s t}$ to produce $S^{24-2}$, i.e., $S_{24-2} = s_2 w_k e^{j2\pi f_s t} = s_1 w_k e^{j2\pi f_s t} = S^{24-1} e^{j2\pi f_s t}$, where $f_s$ is a phase sweep frequency and t is time.

Signals $S^{24-1}$ and $S_{24-2}$ are transmitted at substantially equal power levels over antenna elements 24-1 and 24-2, respectively. Note that the phase sweep signal $e^{j2\pi f_s t}$ is being represented in complex baseband notation, i.e., $e^{j2\pi f_s t} = \cos(2\pi f_s t) + j\sin(2\pi f_s t)$. It should be understood that the phase sweep signal may also be applied at an intermediate frequency or a radio frequency.

Mobile-station 26 receives signal R comprising $\gamma_1 S^{24-1} + \gamma_2 S^{24-2}$. Simplifying the equation for R results in $$R = \gamma_1 S^{24-1} + \gamma_2 S^{24-1} e^{j2\pi f_s t} \text{tm equation 3}$$

$$R = S^{24-1} \{\gamma_1 + \gamma_2 e^{j2\pi f_s t}\} \quad \text{equation 3a}$$

$$R = S^{24-1} \gamma_{eq} \text{tm equation 3b}$$

where $\gamma_{eq}$ is an equivalent channel seen by mobile-station 26. Distortion factor coefficient $\gamma_{eq}$ can be estimated using pilot signals and used, along with equation 3b, to obtain estimates of signal $s_1$ and/or $S_2$.

In slow fading channel conditions, both transmit diversity techniques, i.e., STS and PSTD, improve performance (relative to when no transmit diversity technique is used) by making the received signal strength statistics associated wit a slow fading channel at the receiver look like those associated with a fast fading channel. However, PSTD does not provide the same amount of overall performance improvement as STS. Accordingly, there exists a need for a transmission technique that provides the performance of STS and the backwards compatibility of PSTD without degrading performance of either STS or PSTD.

SUMMARY OF THE INVENTION

The present invention is a method and apparatus for transmission that provides the performance of space time spreading (STS) or orthogonal transmit diversity (OTD) and the backwards compatibility of phase sweep transmit diversity (PSTD) without degrading performance of either STS or PSTD using a symmetric sweep PSTD transmission architecture, which involves phase sweeping a pair of signals having a pair of STS/OTD signals. In one embodiment, a pair of signals $s_1$ and $s_2$ are split into signals $s_1(a)$ and $s_1(b)$ and signals $s_2(a)$ and $s_2(b)$, respectively. Signal $s_1$ comprises a first STS/OTD signal belonging to an STS/OTD pair, and signal $s_2$ comprises a second STS/OTD signal belonging to the STS/OTD pair. Signals $s_1(b)$ and $s_2(b)$ are phase swept using a pair of phase sweep frequency signals that would cancel out any self induced interference caused by phase sweeping both signals $s_1(b)$ and $s_2(b)$. For example, the pair of phase sweep frequency signals utilize a same phase sweep frequency with one of the phase sweep frequency signals rotating in the opposite direction plus an offset of $\pi$ relative to the other phase sweep frequency signal. The resultant phase swept signals $s_1(b)$ and $s_2(b)$ are added to signals $s_2(a)$ and $s_1(a)$ before being amplified and transmitted.

BRIEF DESCRIPTION OF THE DRAWINGS

The features, aspects, and advantages of the present invention will become better understood with regard to the following description, appended claims, and accompanying drawings where

DETAILED DESCRIPTION

Figure 1:
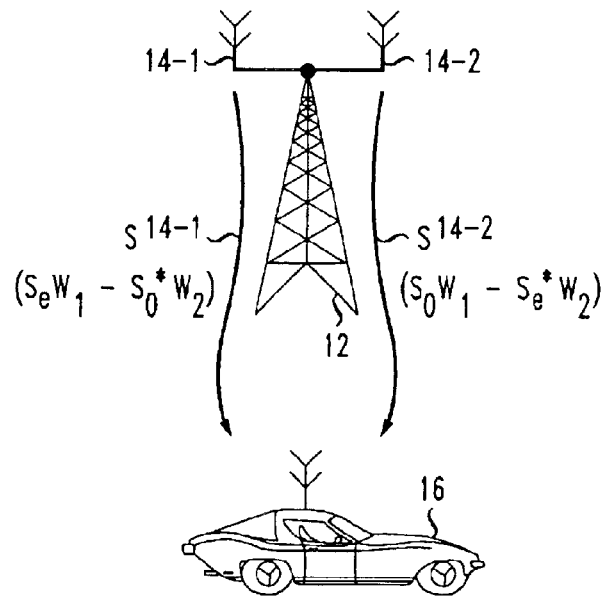
FIG. 1 depicts a wireless communication system employing space time spreading techniques in accordance with the prior art.
Figure 2:
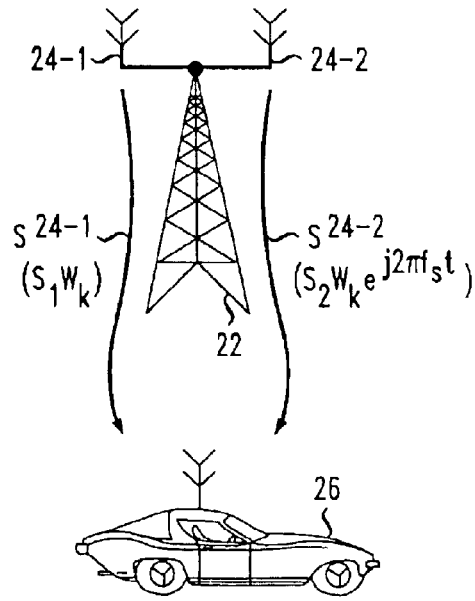
FIG. 2 depicts a wireless communication system employing phase sweep transmit diversity in accordance with the prior art.
Figure 3:
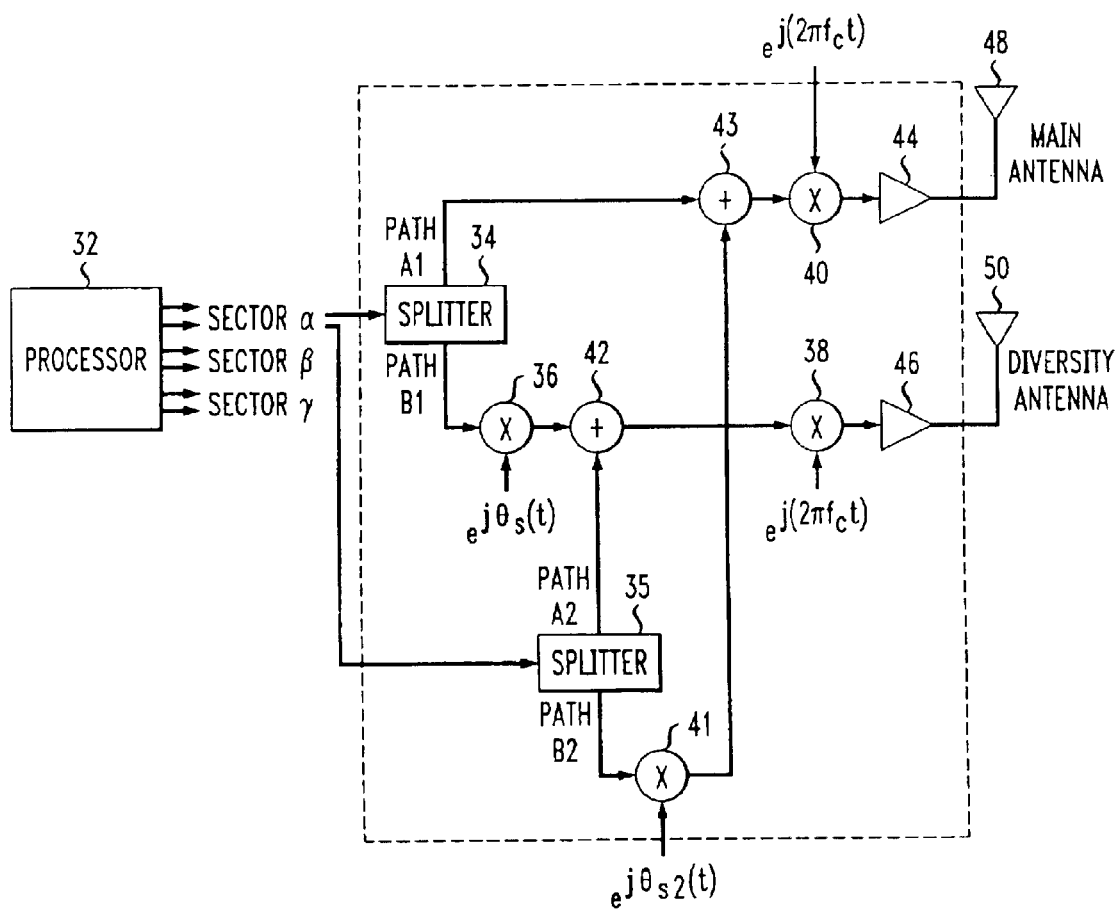
FIG. 3 depicts a base station employing symmetric sweep phase sweep transmit diversity in accordance with one embodiment of the present invention.

FIG. 3 depicts a base station 30 employing symmetric sweep phase sweep transmit diversity in accordance with the present invention, wherein symmetric sweep phase sweep transmit diversity utilizes code division multiple access (CDMA), phase sweep transmit diversity (PSTD), and space time spreading (STS) or orthogonal transmit diversity (OTD) techniques. CDMA, PSTD, STS and OTD are well-known in the art.

Base station 30 provides wireless communication services to mobile-stations, not shown, in its associated geographical coverage area or cell, wherein the cell is divided into three sectors $\alpha$, $\beta$, $\gamma$. Note that the base station could be divided into an arbitrary number of sectors and not change the invention described here. Base station 30 includes a transmission architecture that incorporates STS or OTD and biased PSTD, as will be described herein.

Base station 30 comprises a processor 32, splitters 34, 35, multipliers 36, 38, 40, 41, adders 42, 43, amplifiers 44, 46, and a pair of diversity antennas 48, 50. Note that base station 30 also includes configurations of splitters, multipliers, adders, amplifiers and antennas for sectors $\beta$, $\gamma$ that are identical to those for sector $\alpha$. For simplicity sake, the configuration for sectors $\beta$, $\gamma$ are not shown. Additionally, for discussion purposes, it is assumed that signals $S_k$ are intended for mobile-stations k located in sector $\alpha$ and, thus, the present invention will be described with reference to signals $S_k$ being processed for transmission over sector $\alpha$.

Processor 32 includes software for processing signals $S_k$ in accordance with well-known CDMA and STS/OTD techniques. The manner in which a particular signal $S_k$ is processed by processor 32 depends on whether mobile-station k is STS/OTD compatible, i.e., mobile-station capable of decoding signals processed using STS/OTD. Processor 32 may also include software for determining whether mobile-station k is STS/OTD compatible. If mobile-station k is not STS/OTD compatible, then signal $S_k$ is processed in accordance with CDMA techniques to produce signal $S_{k-1}$, which is also referred to herein as a non-STS/OTD signal $S_{k-1}$.

Note that, in another embodiment, processor 32 is operable to process signals $S_k$ in accordance with a multiple access technique other than CDMA, such as time or frequency division multiple access. In this embodiment, when mobile-station k is not STS/OTD compatible, then signal $S_k$ is processed in accordance with such other multiple access technique to produce the non-STS/OTD signal $S_{k-1}$.

If mobile-station k is STS/OTD compatible, then signal $S_k$ is processed in accordance with CDMA and STS/OTD. Specifically, if mobile-station k is STS compatible, then signal $S_k$ is processed using STS. Such process includes alternately dividing signal $S_k$ into signals $s_e$ and $s_o$, wherein signal $s_e$ comprises even data bits and signal $s_o$ comprises odd data bits. Signal $s_e$ is multiplied with Walsh code $w_1$ to produce signal $s_e w_1$, and a conjugate of signal $s_e$ is multiplied with Walsh code $w_2$ to produce $s_e^* w_2$. Signal $s_o$ is multiplied with Walsh code $w_1$ to produce $s_o w_1$, and a conjugate of signal $s_o$ is multiplied with Walsh code $w_2$ to produce signal $s_o^* w_2$. Signal $s_e w_1$ is added to signal $s_o^* w_2$ to produce signal $S_{k-2}(a) = s_e w_1 + s_o^* w_2$. Signal $s_e^* w_2$ is subtracted from signal $s_o w_1$ to produce signal $S_{k-2}(b) = s_o w_1 - s_e^* w_2$. Signals $S_{k-2}(a)$, $S_{k-2}(b)$ are also referred to herein as STS signals, and together signals $S_{k-2}(a)$, $S_{k-2}(b)$ collectively comprise an STS pair.

If mobile-station k is OTD compatible, then signal $S_k$ is processed using OTD. Orthogonal transmit diversity involves dividing signal $S_k$ into signals $s_e$ and $s_o$, and multiplying signals $s_e$ and $s_o$ using Walsh codes $w_1$, $w_2$ to produce signals $S_{k-3}(a)$, $S_{k-3}(b)$, i.e., $S_{k-3}(a) = s_e w_1$ and $S_{k-3}(b) = s_o w_2$, respectively. Signals $S_{k-3}(a)$, $S_{k-3}(b)$ are also referred to herein as OTD signals, and together signals $S_{k-3}(a)$, $S_{k-3}(b)$ collectively comprise an OTD pair.

For illustration purposes, the present invention will be described herein with reference to STS and signals $S_{k-2}(a)$, $S_{k-2}(b)$. It should be understood that the present invention is also applicable to OTD and signals $S_{k-3}(a)$, $S_{k-3}(b)$.

The output of processor 32 are signals $s_{\alpha-1}$, $s_{\alpha-2}$, where signal $s_{\alpha-1}$ comprises of signals $S_{k-1}$ and $S_{k-2}(a)$ and signal $s_{\alpha-2}$ comprises of signals $S_{k-2}(b)$, i.e., $s_{\alpha-1} = \Sigma S_{k-1} + \Sigma S_{k-2}(a)$ and $s_{\alpha-2} = \Sigma S_{k-2}(b)$. That is, signals intended for STS compatible mobile-stations are included in both output signals $s_{\alpha-1}$, $s_{\alpha-2}$ and signals intended for non-STS compatible mobile-stations are included in only signal $s_{\alpha-1}$. Alternately, signal $s_{\alpha-1}$ comprises of signals $S_{k-1}$ and $S_{k-2}(b)$ and signal $s_{\alpha-2}$ comprises of signals $S_{k-2}(a)$.

Signal $s_{\alpha-1}$ is split by splitter 34 into signals $s_{\alpha-1}(a)$, $s_{\alpha-1}(b)$ and processed along paths A1 and B1, respectively, by multipliers 36, 38, 40, adders 42, 43 and amplifiers 44, 46 in accordance with PSTD techniques. Signal $s_{\alpha-2}$ is split by splitter 35 into signals $s_{\alpha-2}(a)$, $s_{\alpha-2}(b)$ and processed along paths A2 and B2, respectively, by multipliers 38, 40, 41, adders 42, 43 and amplifiers 44, 46 in accordance with PSTD techniques. Note that signals $s_{\alpha-1}(a)$, $s_{\alpha-2}(a)$ are identical to respective signal $s_{\alpha-1}(b)$, $s_{\alpha-2}(b)$ in terms of data, and that signals $s_{\alpha-1}$, $s_{\alpha-2}$ may be evenly or unevenly split in terms of power.

Signals $s_{\alpha-1}(b)$, $s_{\alpha-2}(b)$ are provided as inputs into multipliers 36, 41 where signals $s_{\alpha-1}(b)$, $s_{\alpha-2}(b)$ are frequency phase swept with phase sweep frequency signals (JIMMY: I can't edit the equations, but change all of the "−" signs in the exponents to "+" signs in ALL $e^j$ terms. Please change this in all of the figures as well. $e^{j\Theta_s(t)}$, $e^{j\Theta_{s2}(t)}$ to produce signals $S_{36}=s_{\alpha-1}(b)e^{j\Theta_s(t)}$, $S_{41}=s_{\alpha-2}(b)e^{j\Theta_{s2}(t)}$, respectively, wherein $\Theta_s=2\pi f_s t$, $e^{j\Theta_s(t)}=\cos(2\pi f_s t)+j\sin(2\pi f_s t)$, $\Theta_{s2}=-2\pi f_s t+\pi$, $e^{j\Theta_{s2}(t)}=-\cos(2\pi f_s t)+j\sin(2\pi f_s t)$, $f_s$ represents a fixed or varying phase sweep frequency and t represents time.

Note that phase sweep frequency signals $e^{j\Theta_s(t)}$, $e^{j\Theta_{s2}(t)}$ utilize a same phase sweep frequency with one of the signals, i.e., $e^{j\Theta_{s2}(t)}$, rotating in the opposite direction plus an offset of $\pi$ relative to the other signal, i.e., $e^{j\Theta_s(t)}$. If the phase sweep frequency signals $e^{j\Theta_s(t)}$, $e^{j\Theta_{s2}(t)}$ were identical, i.e., $\Theta_s=\Theta_{s2}$, self induced interference would be generated by base station 30 that would degrade STS/OTD performance. By configuring the phase sweep signals $e^{j\Theta_s(t)}$, $e^{j\Theta_{s2}(t)}$ to have this relationship, the self induced interference is canceled and STS/OTD performance is optimized.

Signal $S_{41}$ is added to signal $s_{\alpha-1}(a)$ by adder 43 to produce signal $S_{43}=S_{41}+s_{\alpha-1}(a)=s_{\alpha-2}(b)e^{j\Theta_{s2}(t)}+s_{\alpha-1}(a)$. Signal $S_{43}$ and carrier signal $e^{j2\pi f_c t}$ are provided as inputs into multiplier 40 to produce signal $S_{40}$, where $S_{40}=(S_{\alpha-2}(b)e^{j\Theta_{s2}(t)}+s_{\alpha-1}(a))e^{j2\pi f_c t}$, $e^{j2\pi f_c t}=\cos(2\pi f_c t)+j\sin(2\pi f_c t)$, and $f_c$ represents a carrier frequency.

Signal $S_{36}$ is added to signal $s_{\alpha-2}(a)$ by adder 42 to produce signal $S_{42}=s_{\alpha-1}(b)e^{j\Theta_s(t)}+s_{\alpha-2}(a)$. Signal $S_{42}$ and carrier signal $e^{j2\pi f_c t}$ are provided as inputs into multiplier 38 to produce signal $S_{38}$, where $S_{38}=(s_{\alpha-1}(b)e^{j\Theta_s(t)}+s_{\alpha-2}(a))e^{j2\pi f_c t}$.

Signals $S_{40}$, $S_{38}$ are amplified by amplifiers 44, 46 to produce signals $S_{44}$ and $S_{46}$ for transmission over antennas 48, 50, where signal $S_{44}=A_{44}((s_{\alpha-2}(b)e^{j\Theta_{s2}(t)}+s_{\alpha-1}(a))e^{j2\pi f_c t})$, $S_{46}=A_{46}(s_{\alpha-1}(b)e^{j\Theta_s(t)}+s_{\alpha-2}(a))e^{j2\pi f_c t}$, $A_{44}$ represents the amount of gain associated with amplifier 44 and $A_{46}$ represents the amount of gain associated with amplifier 46.

In one embodiment, the amounts of gain $A_{44}$, $A_{46}$ are substantially equal. In this embodiment, signals $s_{\alpha-1}$, $s_{\alpha-2}$ are split by splitters 34, 35 such that the power levels of signals $s_{\alpha-1}(a)$, $s_{\alpha-2}(a)$ are substantially equal to the power levels of signal $s_{\alpha-1}(b)$, $s_{\alpha-2}(b)$. Advantageously, equal gain amplifiers can be used, which lowers the cost of base station 30 compared to base station cost when unequal amplifiers are used.

In another embodiment, the amounts of gain $A_{44}$, $A_{46}$ are different and related to how splitters 34, 35 split signals $s_{\alpha-1}$, $s_{\alpha-2}$. Specifically, the amounts of gain $A_{44}$, $A_{46}$ applied to signals $S_{40}$, $S_{38}$ should be amounts that would cause the power levels of signals $S_{44}$ and $S_{46}$ to be approximately or substantially equal. For purposes of this application, power levels are "approximately equal" when the power levels are within 10% of each other.

Figure 5:
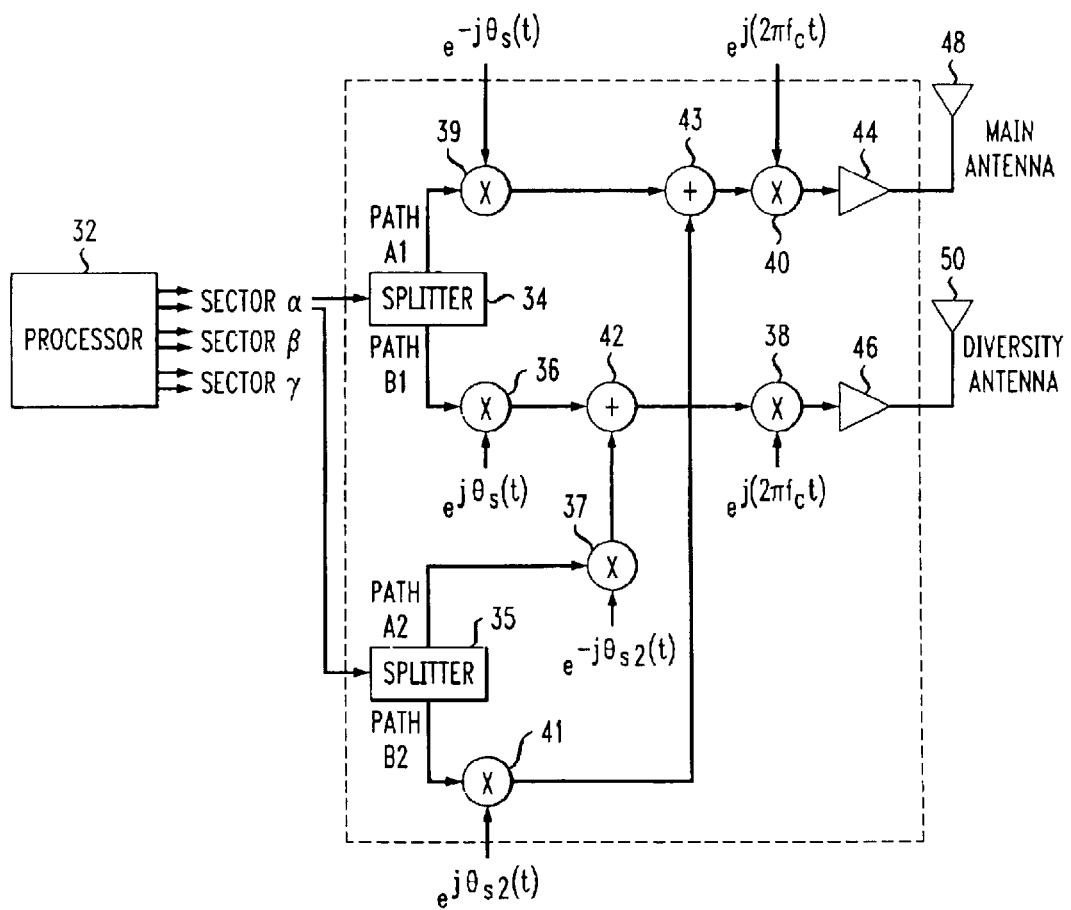
FIG. 5 depicts a base station employing symmetric sweep phase sweep transmit diversity in accordance with another embodiment of the present invention.

FIG. 5 depicts a base station 70 employing symmetric sweep phase sweep transmit diversity in accordance with one embodiment of the present invention. In this embodiment, a form of PSTD referred to herein as split shift PSTD in also utilized. Split shift PSTD involves shifting both signals split from a single signal using phase sweep frequency signals that sweeps both signals in opposite direction. As shown in FIG. 5, signals $s_{\alpha-1}(a)$, $s_{\alpha-2}(a)$ are phase swept by multipliers 37, 39 using phase sweep frequency signals $e^{-j\Theta_s(t)}$, $e^{-j\Theta_{s2}(t)}$, respectively. Although this embodiment depicts phase sweep frequency signals $e^{-j\Theta_s(t)}$, $e^{-j\Theta_{s2}(t)}$ equal and opposite to phase sweep frequency signals $e^{j\Theta_s(t)}$, $e^{j\Theta_{s2}(t)}$, it should be understood that the phase sweep frequency signals used to phase sweep signals $s_{\alpha-1}(a)$, $s_{\alpha-2}(a)$ need not be equal in magnitude. In another embodiment, signals $s_{\alpha-1}(a)$, $s_{\alpha-2}(a)$ are phase swept using phase sweep frequency signals that result in phase swept signals $s_{\alpha-1}(a)$, $s_{\alpha-2}(a)$ with a desired or other phase difference to phase swept signals $s_{\alpha-1}(b)$, $s_{\alpha-2}(b)$. Note that that the phase sweep frequency signal used to phase sweep signals $s_{\alpha-1}(a)$, $s_{\alpha-2}(a)$, $s_{\alpha-1}(b)$, $s_{\alpha-2}(b)$ may be phase shifting at an identical or different rate from each other, may be phase shifting at fixed and/or varying rates, or may be phase shifting in the same or opposite direction.

Figure 4:
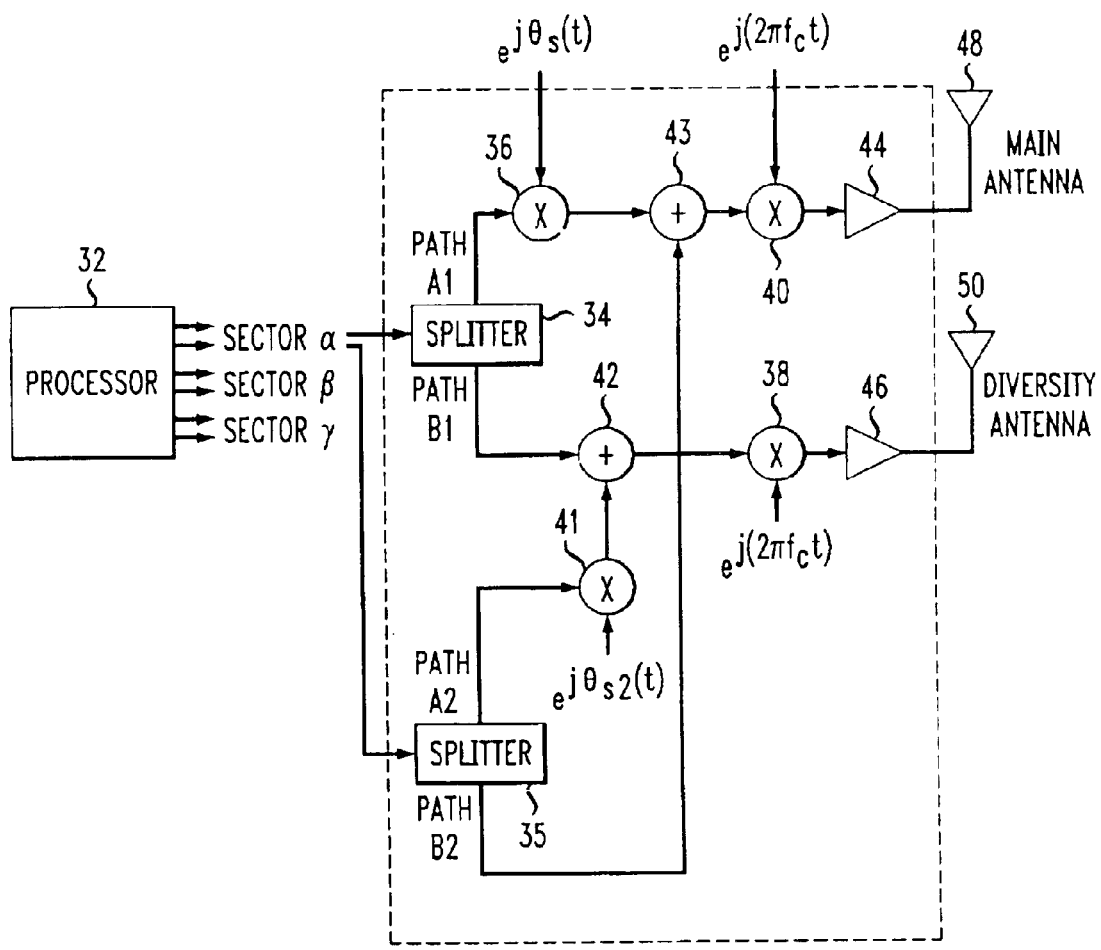
FIG. 4 depicts a base station employing symmetric sweep phase sweep transmit diversity in accordance with another embodiment of the present invention.

Although the present invention has been described in considerable detail with reference to certain embodiments, other versions are possible. For example, phase sweeping could be performed on paths A1 and/or A2 instead of paths B1 and/or B2. In another example, the phase sweep frequency signals are interchanged. FIG. 4 depicts another embodiment of the present invention in which phase sweeping is performed along paths A1 and A2 instead of paths B1 and B2 and phase sweep frequency signals $e^{j\Theta_s(t)}$, $e^{j\Theta_{s2}(t)}$ are provided as inputs into multipliers 41, 36, respectively. Therefore, the spirit and scope of the present invention should not be limited to the description of the embodiments contained herein.

We claim:

1. A method of signal transmission comprising the steps of:

splitting a signal $s_1$ into signals $s_1(a)$ and $s_1(b)$, wherein signal $s_1$ comprises a first STS/OTD signal belonging to an STS/OTD pair;

splitting a signal $s_2$ into signals $s_2(a)$ and $s_2(b)$, wherein signal $s_2$ comprises a second STS/OTD signal belonging to the STS/OTD pair;

phase sweeping the signal $s_1(b)$ using a first phase sweep frequency signal to produce a phase swept signal $s_1(b)$;

phase sweeping the signal $s_2(b)$ using a second phase sweep frequency signal to produce a phase swept signal $s_2(b)$, the first and second phase sweep frequency signals being configured to cancel out any self induced interference caused by phase sweeping the signals $s_1(b)$ and $s_2(b)$;

adding the phase swept signal $s_2(b)$ to the signal $s_1(a)$ to produce a summed signal $s_3$; and adding the phase swept signal $s_1(b)$ to the signal $s_2(a)$ to produce a summed signal $s_4$.

2. The method of claim 1, wherein the first and second phase sweep frequency signals utilize a same phase sweep frequency with the second phase sweep frequency signal rotating in the opposite direction plus an offset of $\pi$ relative to the first phase sweep frequency signal.

3. The method of claim 1, wherein the first and second phase sweep frequency signals utilize a same phase sweep frequency with the first phase sweep frequency signal rotating in the opposite direction plus an offset of $\pi$ relative to the second phase sweep frequency signal.

4. The method of claim 1 comprising the additional steps of:

amplifying the summed signal $s_3$ to produce an amplified summed signal $s_3$; and amplifying the summed signal $s_4$ to produce an amplified summed signal $s_4$.

5. The method of claim 1 comprising the additional steps of:

transmitting the summed signal $s_3$ over a first antenna belonging to a pair of diversity antennas; and transmitting the summed signal $s_4$ over a second antenna belonging to the pair of diversity antennas.

6. The method of claim 1 comprising the additional steps of:
- prior to the step of adding the phase swept signal $s_2(b)$ to the signal $s_1(a)$, phase sweeping the signal $s_1(a)$ using a third phase sweep frequency signal to produce a phase swept signal $s_1(a)$ with a different phase from the phase swept signal $s_2(b)$; and
- prior to the step of adding the phase swept signal $s_1(b)$ to the signal $s_2(a)$, phase sweeping the signal $s_2(a)$ using a fourth phase sweep frequency signal to produce a phase swept signal $s_2(a)$ with a different phase from the phase swept signal $s_1(b)$.

7. A method of signal transmission comprising the steps of:
- splitting a signal $s_1$ into signals $s_1(a)$ and $s_1(b)$, wherein signal $s_1$ comprises a first STS/OTD signal belonging to an STS/OTD pair;
- splitting a signal $s_2$ into signals $s_2(a)$ and $s_2(b)$, wherein signal $s_2$ comprises a second STS/OTD signal belonging to the STS/OTD pair;
- phase sweeping the signal $s_1(a)$ using a first phase sweep frequency signal to produce a phase swept signal $s_1(a)$;
- phase sweeping the signal $s_2(a)$ using a second phase sweep frequency signal to produce a phase swept signal $s_2(a)$, the first and second phase sweep frequency signals being configured to cancel out any self induced interference caused by phase sweeping the signals $s_1(a)$ and $s_2(a)$;
- adding the phase swept signal $s_2(a)$ to the signal $s_1(b)$ to produce a summed signal $s_3$; and
- adding the phase swept signal $s_1(a)$ to the signal $s_2(b)$ to produce a summed signal $s_4$.

8. The method of claim 7, wherein the first and second phase sweep frequency signals utilize a same phase sweep frequency with the second phase sweep frequency signal rotating in the opposite direction plus an offset of $\pi$ relative to the first phase sweep frequency signal.

9. The method of claim 7, wherein the first and second phase sweep frequency signals utilize a same phase sweep frequency with the first phase sweep frequency signal rotating in the opposite direction plus an offset of $\pi$ relative to the second phase sweep frequency signal.

10. The method of claim 7 comprising the additional steps of:
- amplifying the summed signal $s_3$ to produce an amplified summed signal $s_3$; and
- amplifying the summed signal $s_4$ to produce an amplified summed signal $s_4$.

11. The method of claim 7 comprising the additional steps of:
- transmitting the summed signal $s_3$ over a first antenna belonging to a pair of diversity antennas; and
- transmitting the summed signal $s_4$ over a second antenna belonging to the pair of diversity antennas.

12. The method of claim 7 comprising the additional steps of:
- prior to the step of adding the phase swept signal $s_2(a)$ to the signal $s_1(b)$, phase sweeping the signal $s_1(b)$ using a third phase sweep frequency signal to produce a phase swept signal $s_1(b)$ with a different phase from the phase swept signal $s_2(a)$; and
- prior to the step of adding the phase swept signal $s_1(a)$ to the signal $s_2(b)$, phase sweeping the signal $s_2(b)$ using a fourth phase sweep frequency signal to produce a phase swept signal $s_2(b)$ with a different phase from the phase swept signal $s_1(a)$.

13. A base station comprising:
- a first splitter for splitting a signal $s_1$ into signals $s_1(a)$ and $s_1(b)$, wherein signal $s_1$ comprises a first STS/OTD signal belonging to an STS/OTD pair;
- a second splitter for splitting a signal $s_2$ into signals $s_2(a)$ and $s_2(b)$, wherein signal $s_2$ comprises a second STS/OTD signal belonging to the STS/OTD pair,
- a first multiplier for phase sweeping the signal $s_1(b)$ using a first phase sweep frequency signal to produce a phase swept signal $s_1(b)$;
- a second multiplier for phase sweeping the signal $s_2(b)$ using a second phase sweep frequency signal to produce a phase swept signal $s_2(b)$, the first and second phase sweep frequency signals being configured to cancel out any self induced interference caused by phase sweeping the signals $s_1(b)$ and $s_2(b)$;
- a first adder for adding the phase swept signal $s_2(b)$ to the signal $s_1(a)$ to produce a summed signal $s_3$; and
- a second adder for adding the phase swept signal $s_1(b)$ to the signal $s_2(a)$ to produce a summed signal $s_4$.

14. The base station of claim 13, wherein the first and second phase sweep frequency signals utilize a same phase sweep frequency with the second phase sweep frequency signal rotating in the opposite direction plus an offset of $\pi$ relative to the first phase sweep frequency signal.

15. The base station of claim 13, wherein the first and second phase sweep frequency signals utilize a same phase sweep frequency with the first phase sweep frequency signal rotating in the opposite direction plus an offset of $\pi$ relative to the second phase sweep frequency signal.

16. The base station of claim 13 further comprising:
- a first amplifier for amplifying the summed signal $s_3$ to produce an amplified summed signal $s_3$; and
- a second amplifier for amplifying the summed signal $s_4$ to produce an amplified summed signal $s_4$.

17. The base station of claim 13 further comprising:
- a pair of diversity antennas having a first and a second antenna;
- a first transmitter for transmitting the summed signal $s_3$ over the first antenna; and
- a second transmitter for transmitting the summed signal $s_4$ over the second antenna.

18. The base station of claim 13 further comprising:
- a third multiplier for phase sweeping the signal $s_1(a)$ using a third phase sweep frequency signal to produce a phase swept signal $s_1(a)$ with a different phase from the phase swept signal $s_2(b)$ prior to adding the phase swept signal $s_2(b)$ to the signal $s_1(a)$; and
- a fourth multiplier for phase sweeping the signal $s_2(a)$ using a fourth phase sweep frequency signal to produce a phase swept signal $s_2(a)$ with a different phase from the phase swept signal $s_1(b)$ prior to adding the phase swept signal $s_1(b)$ to the signal $s_2(a)$.

19. A base station comprising:
- a first splitter for splitting a signal $s_1$ into signals $s_1(a)$ and $s_1(b)$, wherein signal $s_1$ comprises a first STS/OTD signal belonging to an STS/OTD pair;
- a second splitter for splitting a signal $s_2$ into signals $s_2(a)$ and $s_2(b)$, wherein signal $s_2$ comprises a second STS/OTD signal belonging to the STS/OTD pair;
- a first multiplier for phase sweeping the signal $s_1(a)$ using a first phase sweep frequency signal to produce a phase swept signal $s_1(a)$;
- a second multiplier for phase sweeping the signal $s_2(a)$ using a second phase sweep frequency signal to produce a phase swept signal $s_2(a)$, the first and second phase sweep frequency signals being configured to cancel out any self induced interference caused by phase sweeping the signals $s_1(a)$ and $s_2(a)$;

a first adder for adding the phase swept signal $s_2(a)$ to the signal $s_1(b)$ to produce a summed signal $s_3$; and a second adder for adding the phase swept signal $s_1(a)$ to the signal $s_2(b)$ to produce a summed signal $s_4$.

20. The base station of claim 19, wherein the first and second phase sweep frequency signals utilize a same phase sweep frequency with the second phase sweep frequency signal rotating in the opposite direction plus an offset of $\pi$ relative to the first phase sweep frequency signal.

21. The base station of claim 19, wherein the first and second phase sweep frequency signals utilize a same phase sweep frequency with the first phase sweep frequency signal rotating in the opposite direction plus an offset of $\pi$ relative to the second phase sweep frequency signal.

22. The base station of claim 19 further comprising:

a first amplifier for amplifying the summed signal $s_3$ to produce an amplified summed signal $s_3$; and a second amplifier for amplifying the summed signal $s_4$ to produce an amplified summed signal $s_4$.

23. The base station of claim 19 further comprising:

a pair of diversity antennas having a first and a second antenna;

a first transmitter for transmitting the summed signal $s_3$ over the first antenna; and a second transmitter for transmitting the summed signal $s_4$ over the second antenna.

24. The base station of claim 19 further comprising:

a third multiplier for phase sweeping the signal $s_1(b)$ using a third phase sweep frequency signal to produce a phase swept signal $s_1(b)$ with a different phase from the phase swept signal $s_2(a)$ prior to adding the phase swept signal $s_2(a)$ to the signal $s_1(b)$; and a fourth multiplier for phase sweeping the signal $s_2(b)$ using a fourth phase sweep frequency signal to produce a phase swept signal $s_2(b)$ with a different phase from the phase swept signal $s_1(a)$ prior to adding the phase swept signal $s_1(a)$ to the signal $s_2(b)$.

* * * * *